US010520021B2

(12) United States Patent
Furusawa et al.

(10) Patent No.: US 10,520,021 B2
(45) Date of Patent: Dec. 31, 2019

(54) MOTION GUIDE DEVICE

(71) Applicant: THK CO., LTD., Tokyo (JP)

(72) Inventors: Ryuji Furusawa, Tokyo (JP); Atsuhiro Tanaka, Tokyo (JP)

(73) Assignee: THK CO., LTD., Tokyo (JP)

( * ) Notice: Subject to any disclaimer, the term of this patent is extended or adjusted under 35 U.S.C. 154(b) by 0 days.

(21) Appl. No.: 16/340,509

(22) PCT Filed: Sep. 8, 2017

(86) PCT No.: PCT/JP2017/032441
§ 371 (c)(1),
(2) Date: Apr. 9, 2019

(87) PCT Pub. No.: WO2018/074097
PCT Pub. Date: Apr. 26, 2018

(65) Prior Publication Data
US 2019/0242433 A1 Aug. 8, 2019

(30) Foreign Application Priority Data
Oct. 20, 2016 (JP) ................................ 2016-206042

(51) Int. Cl.
*F16C 29/06* (2006.01)
*F16C 29/00* (2006.01)

(52) U.S. Cl.
CPC ............ *F16C 29/06* (2013.01); *F16C 29/005* (2013.01)

(58) Field of Classification Search
CPC .. F16C 29/005; F16C 29/0633; F16C 29/035; F16C 29/0638; F16C 29/064;
(Continued)

(56) References Cited

U.S. PATENT DOCUMENTS 8,821,020 B2 * 9/2014 Aida ..................... F16C 29/005
29/898.03
2006/0066232 A1 * 3/2006 Utsumi .................. H01L 33/22
313/506

FOREIGN PATENT DOCUMENTS

DE 102008008632 A1 8/2009
JP 5-321932 A 12/1993
(Continued)

OTHER PUBLICATIONS

International Search Report dated Oct. 31, 2017, issued in counterpart International Application No. PCT/JP2017/032441 (1 page).
(Continued)

*Primary Examiner* — Phillip A Johnson
(74) *Attorney, Agent, or Firm* — Westerman, Hattori, Daniels & Adrian, LLP

(57) ABSTRACT

A motion guide device including a hollow track base that has a rolling element rolling face formed along a longitudinal direction and has a hollow portion formed to be substantially rectangular in section along the longitudinal direction, and a moving member that has a load rolling element rolling face formed in a position facing the rolling element rolling face, the moving member being assembled movably in the longitudinal direction of the track base via a plurality of rolling elements between the rolling element rolling face and the load rolling element rolling face, wherein in the track base, a heat-treated region in which heat treatment is applied to a region including the rolling element rolling face and a non-heat-treated region to which heat treatment is not applied are formed in a section orthogonal to the longitudinal direction, and the heat-treated region is not superimposed on corner portions of the hollow portion.

4 Claims, 4 Drawing Sheets

(58) Field of Classification Search
CPC .............. F16C 29/0645; F16C 29/0647; F16C 29/0652; F16C 29/0654; F16C 29/0657; F16C 29/0659; F16C 29/0661; F16C 29/0664; F16C 29/0669
See application file for complete search history.

(56) References Cited

FOREIGN PATENT DOCUMENTS

| | | |
|---|---|---|
| JP | 6-264922 A | 9/1994 |
| JP | 2014-163509 A | 9/2014 |
| TW | 200643189 A | 12/2006 |

OTHER PUBLICATIONS

Notification of Reasons for Refusal dated May 1, 2018, issued in counterpart of Japanese Patent Application No. 2016-206042 with English Translation (4 pages).
Decision to Grant a Patent dated Jul. 24, 2018, issued in counterpart of Japanese Patent Application No. 2016-206042 with English Translation (6 pages).
Chang, Liu Zong, "Quenching Crack of Steel Parts and Preventive Methods", Metallurgical Industry Press Co., Ltd., China, w/English abstract; Cited in TW Office Action dated Jul. 9, 2019 and CN Office Action dated Aug. 5, 2019.

* cited by examiner

MOTION GUIDE DEVICE

TECHNICAL FIELD

The present invention relates to a motion guide device.

BACKGROUND ART

In motion guide sections on a worktable of a machine tool and various conveying devices, motion guide devices in which moving members with table members attached thereto continuously move along track bases are used.

As the conventional motion guide device as above, track bases are installed substantially parallel with mounting surfaces, moving members are placed on the respective track bases via a large number of rolling elements, and table members are mounted to the respective moving members. Accordingly, in the conventional motion guide device, in order to realize smooth movement of the moving members, the intervals among the track bases need to be constant in the entire region in the range where the moving members move. Further, in order to solve the aforementioned problem, the motion guide device described in Patent Literature 1 as follows can absorb a parallelism error of the track bases by the track bases formed into hollow shapes, using the fact that the track bases deform within an elastic limit.

Patent Literature 1: Japanese Patent Laid-Open No. 05-321932

DISCLOSURE OF THE INVENTION

Problems for Solving the Problems

However, according to the motion guide device described in Patent Literature 1 described above, surface treatment such as induction hardening and carburizing and quenching is applied to the surface of a rolling element rolling surface, and rolling life is ensured by forming an effective case layer on the surface of the rolling element rolling face, but if the effective case layer is formed in a hollow corner portion, there arises the case that when a load is applied, stress concentrates on the hollow corner portion, whereby a crack or the like is generated in the corner portion and breakage is likely to occur.

The present invention is made to solve the above described case, and has an object to provide a motion guide device capable of improving fatigue characteristics by improving spring characteristics by enhancing an elastic effect of an entire track base while ensuring an effective case layer of a rolling element rolling face to a load accompanying movement of a moving member and rolling of rolling elements.

Means for Solving the Problems

A motion guide device according to the present invention that solves the above described case is a motion guide device including a track base that has a rolling element rolling face formed along a longitudinal direction and has a hollow portion formed to be substantially rectangular in section along a longitudinal direction, and a moving member that has a load rolling element rolling face formed in a position facing the rolling element rolling face, the moving member being assembled movably in the longitudinal direction of the track base via a plurality of rolling elements between the rolling element rolling face and the load rolling element rolling face, wherein in the track base, a heat treated region in which heat treatment is applied to a region including the rolling element rolling face, and a non-heat-treated region to which heat treatment is not applied are formed in a section orthogonal to the longitudinal direction, and the heat-treated region is not superimposed on at least some of corner portions of the hollow portion.

Effects of the Invention

According to the present invention, in the track base, in the section orthogonal to the longitudinal direction, the heat-treated region where the heat treatment is applied to the region including the rolling element rolling face, and the non-heat-treated region to which heat treatment is not applied are formed, and the heat-treated region is not superimposed on at least some corner portions of the hollow portion, so that fatigue characteristics can be improved by improving spring characteristics by enhancing the elastic effect of the entire track base while ensuring the effective case layer of the rolling element rolling face to the load accompanying movement of the moving member and the rolling of the rolling element.

MODE FOR CARRYING OUT THE INVENTION

Hereinafter, embodiments of a motion guide device according to the present invention will be described with reference to the drawings. Note that the following embodiments do not limit the invention according to the respective claims, and all combinations of features described in the embodiments are not always essential to the solution of the invention.

[First Embodiment]

Figure 1:
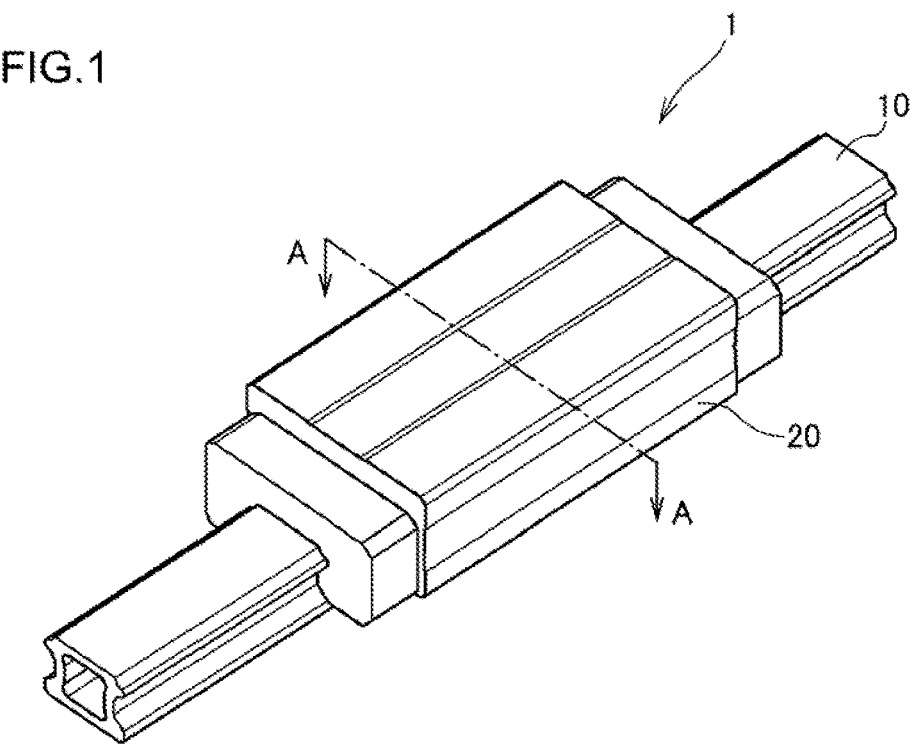
FIG. 1 is a perspective view of a motion guide device according to a first embodiment of the present invention.
Figure 2:
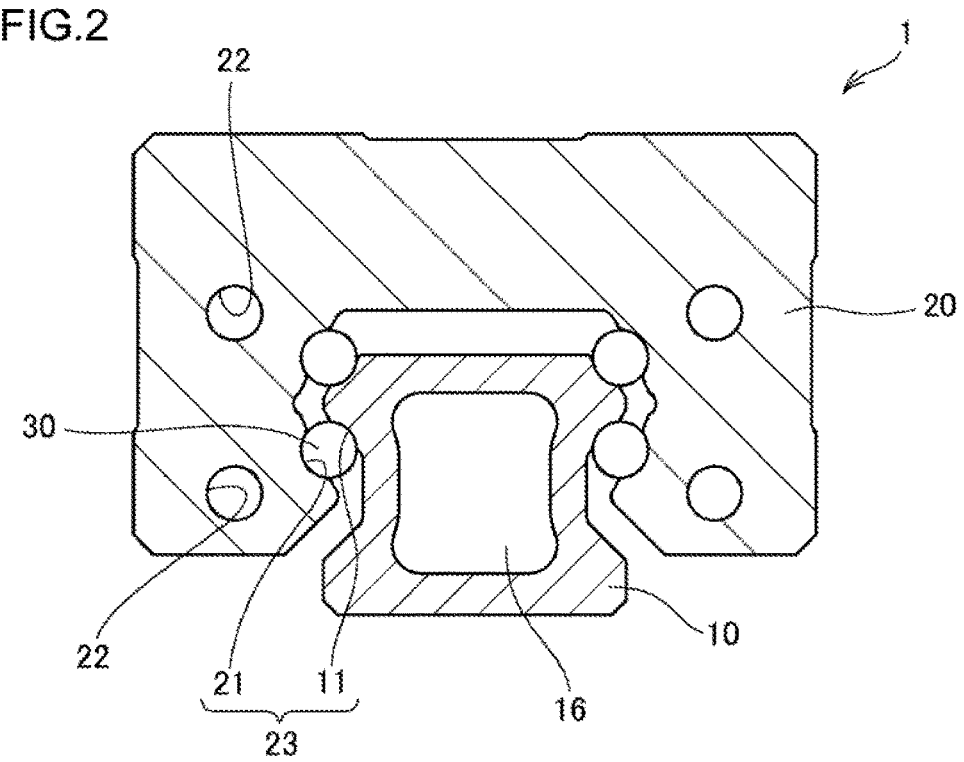
FIG. 2 is a sectional view taken along line A-A in FIG. 1.
Figure 3:
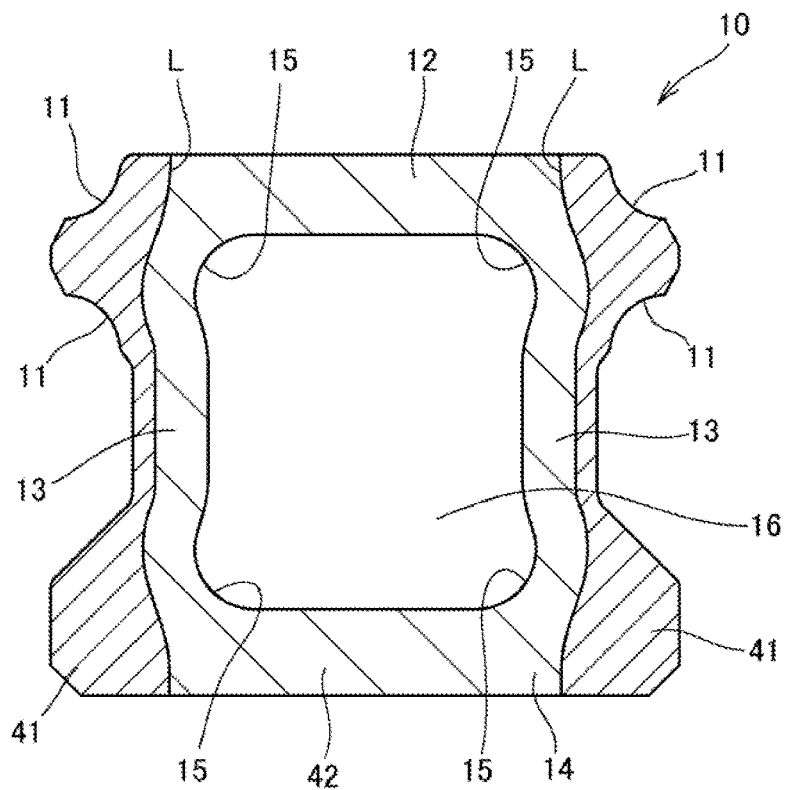
FIG. 3 is a vertical sectional view of a hollow track base according to the first embodiment of the present invention.
Figure 4:
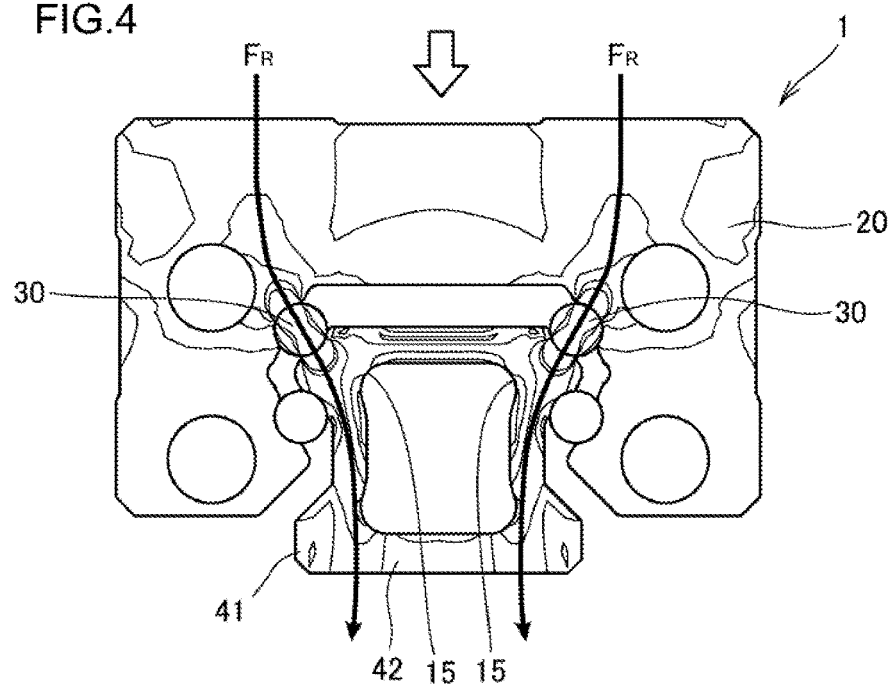
FIG. 4 is a vertical sectional view illustrating a stress distribution in a case of a radial load being applied of the motion guide device according to the first embodiment of the present invention.
Figure 5:
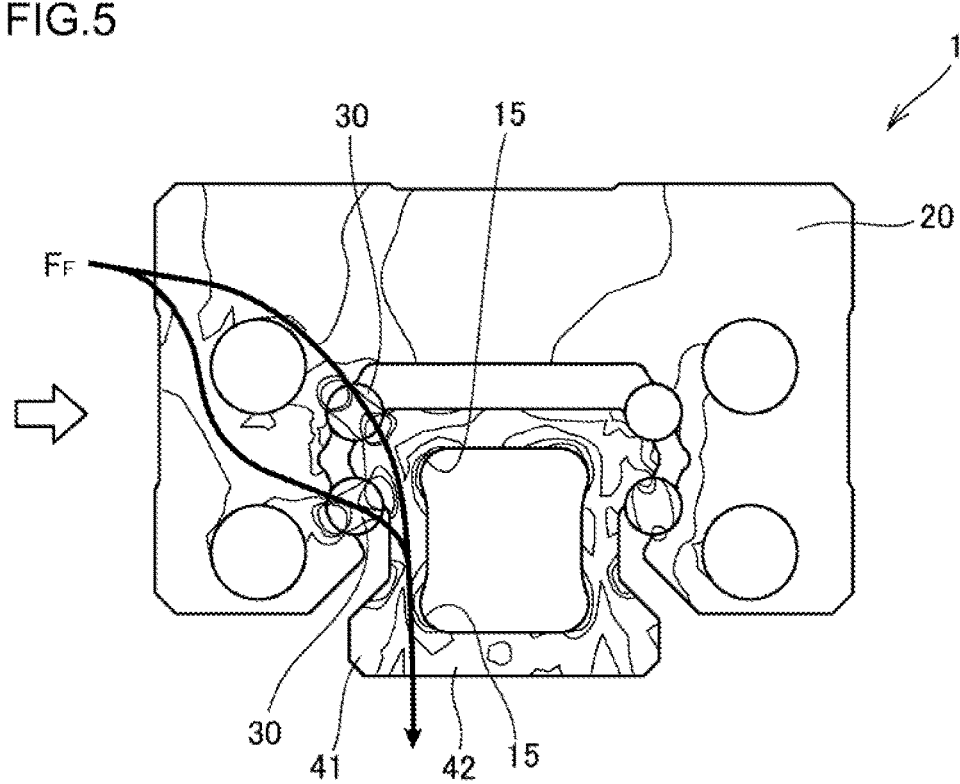
FIG. 5 is a vertical sectional view illustrating a stress distribution in a case of a horizontal load being applied of the motion guide device according to the first embodiment of the present invention.

FIG. 1 is a perspective view of a motion guide device according to a first embodiment of the present invention, FIG. 2 is a sectional view taken along line A-A in FIG. 1, FIG. 3 is a vertical sectional view of a hollow track base according to the first embodiment of the present invention, FIG. 4 is a vertical sectional view illustrating a stress distribution in a case of a radial load being applied of the motion guide device according to the first embodiment of the present invention, and FIG. 5 is a vertical sectional view illustrating a stress distribution in a case of a horizontal load being applied of the motion guide device according to the first embodiment of the present invention.

The motion guide device according to the first embodiment that is illustrated in FIG. 1 and FIG. 2 is configured as a linear motion guide device. A motion guide device 1 according to the first embodiment includes a track base 10 having a rolling element rolling face 11 in a longitudinal direction, and a moving member 20 that is assembled to the aforementioned track base 10 via a plurality of rolling elements 30 and reciprocates linearly along the rolling element rolling face 11.

As illustrated in FIG. 2, the track base 10 is a member in which four rolling element rolling faces 11 extending in the longitudinal direction are formed on a surface thereof, and the rolling element rolling face 11 is configured to be able to receive a load from a rolling element 30 in a spherical shape disposed between the rolling element rolling face 11 and the moving member 20 which will be described later. Further, a section orthogonal to the longitudinal direction of the rolling element rolling face 11 is formed into a circular-arc shape with such a precision as to be able to realize smooth rolling of the rolling element 30.

On the moving member 20, a load rolling element rolling face 21 is formed in a position facing the rolling element rolling face 11 formed on the track base 10. A load rolling element rolling passage 23 is formed by the rolling element rolling face 11 and the load rolling element rolling face 21. Further, the rolling element rolling faces 11, the load rolling element rolling faces 21 and the rolling elements 30 are arranged in two rows vertically to configure a DF structure in which the rolling elements 30 and 30 are disposed to be mutually aligned face to face.

Further, curvatures of the circular-arc shape of the rolling element rolling surface 11 formed on the track base 10, and a circular-arc shape of the load rolling element rolling face 21 formed on the moving member 20 are formed to be substantially the same, and are formed to be smaller than a curvature of the rolling element 30. By forming the curvatures of the rolling element rolling face 11 and the load rolling element rolling face 21 to be substantially the same in this way, smooth rolling of the rolling element 30 which rolls on the load rolling element rolling passage 23 can be realized.

Further, in the longitudinal direction of the moving member 20, four of no-load rolling element rolling passages 22 are formed. The no-load rolling element rolling passage 22 and the load rolling element rolling passage 23 continue to each other by direction changing passages not illustrated that are formed at both end portions in the longitudinal direction of the moving member 20, and are formed such that the rolling element 30 which rolls to an end point of the load rolling element rolling passage 23 while applying the load, passes through the no-load rolling element rolling passage 22 via the direction changing passage on one side, and can return to a start point of the load rolling element rolling passage 23 via the direction changing passage on the other side. In this way, the rolling element 30 realizes endless circulation by the load rolling element rolling passage 23, the direction changing passages and the no-load rolling element rolling passage 22.

Next, with reference to FIG. 3, the hollow track base 10 according to the first embodiment will be described.

As illustrated in FIG. 3, the hollow track base 10 according to the first embodiment includes a top side 12 where the rolling element rolling surfaces 11 are formed at both ends, a pair of sides 13 and 13 that have the rolling element rolling faces 11 formed at upper ends and are vertically provided downward from both end portions of the top side 12, and a bottom side 14 formed to connect lower ends of the pair of sides 13 and 13.

In this way, the track base 10 is formed by the top side 12 with an outer side surface formed to be flat, and the pair of sides 13 and 13, and the bottom side 14 with an outer side surface formed to be flat, so that a hollow portion 16 that is hollow along a longitudinal direction is formed inside of the track base 10 enclosed by the top side 12, the pair of sides 13 and 13 and the bottom side 14, and the hollow portion 16 has a section orthogonal to the longitudinal direction formed into a rectangular shape having side portions formed of the top side 12, the pair of sides 13 and 13 and the bottom side 14. Further, an inner peripheral side of each of corner portions 15 of the hollow portion 16 is formed into a circular-arc shape.

Further, mounting holes not illustrated are formed by being bored in central portions of the top side 12 and the bottom side 14, and by fastening bolts or the like to the mounting holes, the track base 10 can be mounted by being fixed to a device or the like.

The sides 13 and 13 include heat-treated regions 41 where heat treatment is applied to regions including the rolling element rolling faces 11 and 11, and non-heat-treated regions 42 formed as a raw material without heat treatment being applied. Further, the non-heat-treated regions 42 are also formed on the top side 12 and the bottom side 14, and are formed throughout an entire periphery of the hollow portion 16. Accordingly, the heat-treated region 41 is not superimposed on the corner portions 15.

Here, to the heat-treated region 41, heat treatment is performed to such an extent that a predetermined effective case layer can be formed in consideration of rolling life of the rolling element rolling face 11 due to the rolling element 30 that rolls on the rolling element rolling face 11. Further, in order to prevent tenacity of the track base 10 from being reduced by heat treatment, the entire periphery of the hollow portion 16 including at least the corner portions 15 is formed as the non-heat-treated region 42, whereby breakage of the corner portions 15 by stress concentrating on the corner portions 15 is prevented. Note that as the heat treatment, any heat treatment may be performed as long as the rolling life of the rolling element rolling face 11 can be ensured, but, for example, carburizing and quenching, induction hardening and the like are preferably used.

That is, a border line L between the heat-treated region 41 and the non-heat-treated region 42 are provided to extend between the heat-treated region 41 and the non-heat-treated region 42 so as not to be superimposed on the effective case layer that is a quenched range for ensuring the rolling life of the rolling element rolling face 11, and the corner portions 15.

When a radial load is applied as illustrated in FIG. 4 to the motion guide device 1 according to the present embodiment configured in this way, the radial load is applied as a transmission line FR, and in the heat-treated region 41, in a depth portion of the effective case layer, a yield point of the material of the track base 10 is raised. Further, as described above, in a place where the transmission line FR passes, the heat-treated region 41 is formed, and the non-heat-treated region 42 is formed in a remaining part including the corner portions 15, so that the non-heat-treated region 42 with high tenacity is present, whereby breakage is restrained from occurring from the corner portion 15 when a load is applied.

Further, as illustrated in FIG. 5, when a horizontal load is applied from one direction, the horizontal load is applied as a transmission line FF, and the yield point of the material in the rolling element rolling face 11 is raised without stress concentrating on the corner portion 15, whereby reduction in stress to the corner portions 15 of the hollow portion 16 of the track base 10 is achieved.

By forming the non-heat-treated region 42 on the track base 10, reduction in stress to the corner portions 15 of the hollow portion 16 of the track base 10 can be achieved even when either load of the radial load and the horizontal load is applied, spring characteristics of the entire track base 10 is enhanced by the elastic effect, and fatigue characteristics can be improved.

Further, in the hollow portion 16, the non-heat-treated region 42 can be formed throughout the entire periphery in the section orthogonal to the longitudinal direction, and the border line L between the heat-treated region 41 and the non-heat-treated region 42 is provided to extend so as not to be superimposed on the effective case layer and the corner portion 15, so that the non-heat-treated region 42 can be properly formed in accordance with the specifications.

Further, since the corner portion 15 of the hollow portion 16 is formed into a circular-arc shape, so that stress reduction can be achieved when a load is applied, and breakage accompanying stress concentration can be prevented.

The hollow track base 10 configuring the motion guide device 1 according to the first embodiment is described thus far. As for the hollow track base 10 configuring the motion guide device 1 according to the first embodiment, explanation is made about the case where a so-called DF structure in which the rolling elements 30 are disposed to be aligned face to face is adopted. However, the motion guide device according to the present invention is not limited to the sectional shape illustrated in the first embodiment. Therefore, next, a track base having a different shape from the shape of the first embodiment will be described. Further, the same members as or analogous members to the members of the first embodiment will be assigned with the same reference signs, and explanation thereof will be omitted.

[Second Embodiment]

Figure 6:
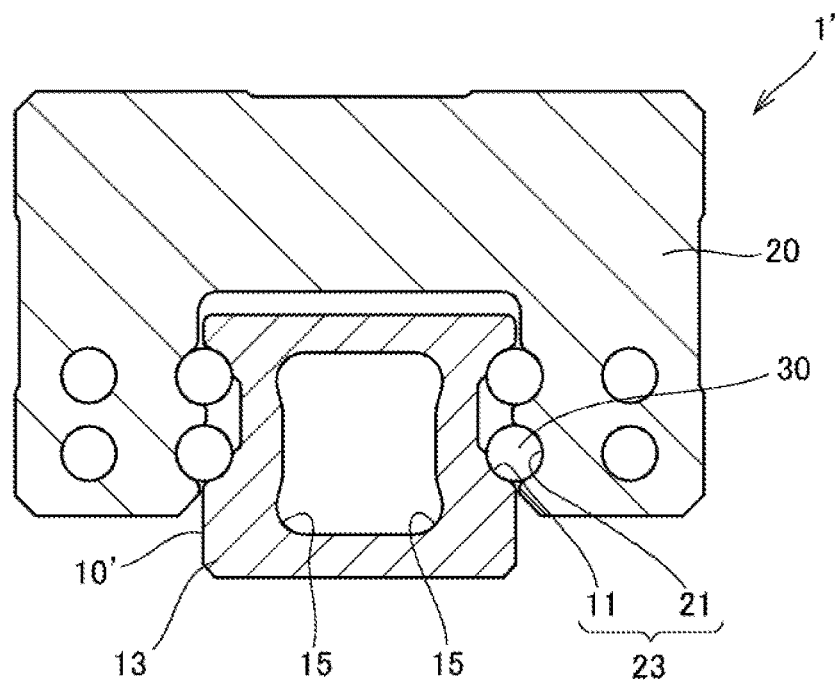
FIG. 6 is a sectional view of a motion guide device according to a second embodiment of the present invention.
Figure 7:
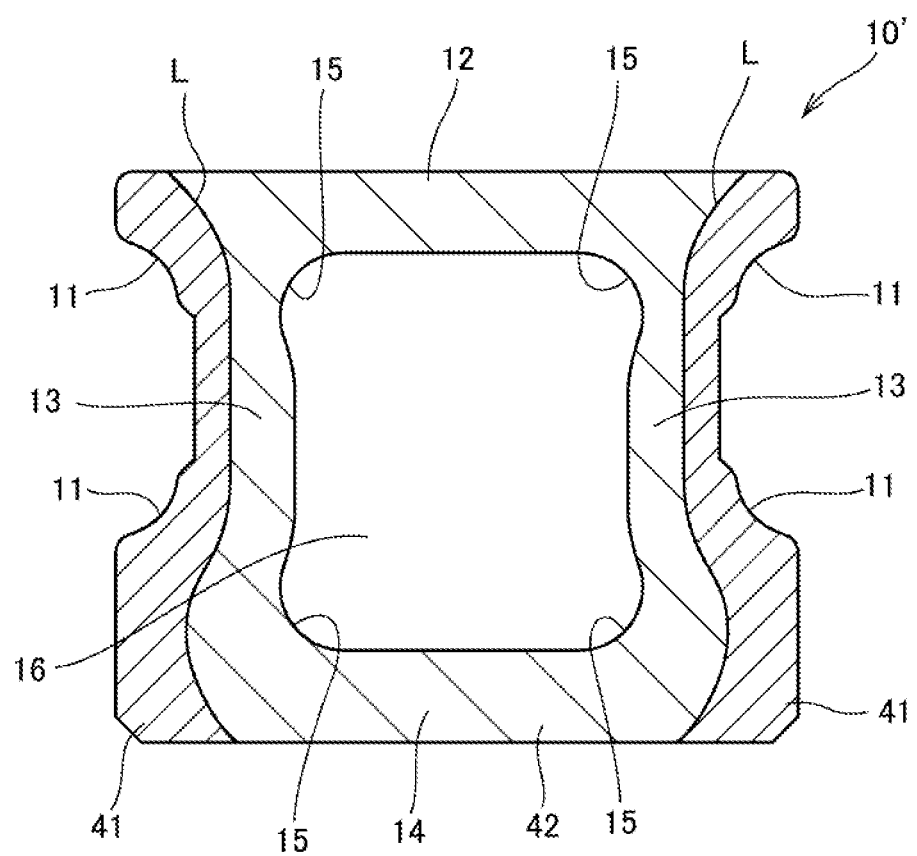
FIG. 7 is a vertical sectional view of a hollow track base according to a second embodiment of the present invention.

FIG. 6 is a sectional view of a motion guide device according to a second embodiment of the present invention, and FIG. 7 is a vertical sectional view of a hollow track base according to the second embodiment of the present invention.

As illustrated in FIG. 6 and FIG. 7, in a motion guide device 1' according to the present embodiment, the rolling element rolling faces 11, the load rolling element rolling faces 21 and the rolling elements 30 are arranged in two rows vertically similarly to the motion guide device 1 according to the first embodiment, but the motion guide device 1' configures a so-called DB structure in which the rolling elements 30 and 30 are disposed to be aligned back to back mutually.

Further, the sides 13 and 13 include the heat-treated region 41 to which heat treatment is applied in the region including the rolling element rolling faces 11 and 11, and non-heat-treated region 42 formed as a raw material without heat treatment being applied. Further, the non-heat-treated regions 42 are also formed on the top side 12 and the bottom side 14, and are formed throughout the entire periphery of the hollow portion 16. Accordingly, the heat-treated region 41 is not superimposed on the corner portions 15.

That is, the border line L between the heat-treated region 41 and the non-heat-treated region 42 is provided to extend between the heat-treated region 41 and the non-heat-treated region 42 so as not to be superimposed on the effective case layer that is the quenched range for ensuring rolling life of the rolling element rolling face 11 and the corner portions 15.

In this way, the motion guide device 1' according to the present embodiment adopts the DB structure, but the non-heat-treated region 42 is formed in the track base 10' similarly to the motion guide device 1 according to the first embodiment, so that even when either load of the radial load and the horizontal load is applied, reduction in stress to the corner portions 15 of the hollow portion 16 of the track base 10' is achieved, spring characteristics of the entire track base 10' is enhanced by an elastic effect, and fatigue characteristics can be improved.

Further, in the aforementioned first and second embodiments, the case where spherical balls are used for the rolling elements 30 is described, but the rolling element is not limited to the ball, and, for example, a columnar roller may be used. Further, for example, in the motion guide device according to the present embodiment, all the corner portions 15 of the hollow portion 16 are formed of the non-heat-treated region, but the range of the non-heat-treated region is not limited to this, and even when only the corner portions at a bottom side which is fixed with a bolt is formed of the non-heat-treated region, a similar effect can be obtained. It is obvious from the claims that a mode to which such a modification or an alteration is added can be also included in the technical range of the present invention.

REFERENCE NUMERALS

1, 1' Motion guide device, 10, 10' Track base, 11 Rolling element rolling face, 12 Top side, 13, 131 side, 14 Bottom side, 15 Corner portion, 16 Hollow portion, 20 Moving member, 21 Load rolling element rolling face, 22 No-load rolling element rolling passage, 23 Load rolling element rolling passage, 30 rolling element, 41 Heat-treated region, 42 Non-heat-treated region, L Border line

The invention claimed is:

1. A motion guide device, comprising:
   a track base that has a rolling element rolling face formed along a longitudinal direction and has a hollow portion formed to be substantially rectangular in section along a longitudinal direction; and
   a moving member that has a load rolling element rolling face formed in a position facing the rolling element rolling face,
   the moving member being assembled movably in the longitudinal direction of the track base via a plurality of rolling elements between the rolling element rolling face and the load rolling element rolling face,
   wherein in the track base, a heat-treated region in which heat treatment is applied to a region including the rolling element rolling face and a non-heat-treated region to which heat treatment is not applied are formed in a section orthogonal to the longitudinal direction, and
   the heat-treated region is formed not to be superimposed on at least some of corner portions of the hollow portion, and
   a border line between the heat-treated region and the non-heat-treated region is provided to extend continuously along a radial direction not to be superimposed on a quenched range, in which range rolling life of the rolling element rolling face can be ensured, and the corner portions.

2. The motion guide device according to claim 1, wherein in the section orthogonal to the longitudinal direction, in the hollow portion, the non-heat-treated region is formed throughout an entire periphery.

3. The motion guide device according to claim 1,
wherein in the hollow portion, the corner portions are each formed into a circular-arc shape.

4. The motion guide device according to claim 2,
wherein in the hollow portion, the corner portions are each formed into a circular-arc shape.

* * * * *